United States Patent
Le et al.

(10) Patent No.: US 12,387,376 B2
(45) Date of Patent: Aug. 12, 2025

(54) DYNAMIC CALIBRATION CORRECTION IN MULTI-FRAME, MULTI-EXPOSURE CAPTURE

(71) Applicant: Samsung Electronics Co., Ltd., Suwon-si (KR)

(72) Inventors: Nguyen Thang Long Le, Richardson, TX (US); John William Glotzbach, Allen, TX (US); Hamid Rahim Sheikh, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/410,511

(22) Filed: Jan. 11, 2024

(65) Prior Publication Data

US 2024/0144534 A1    May 2, 2024

Related U.S. Application Data

(63) Continuation of application No. 17/573,031, filed on Jan. 11, 2022, now Pat. No. 11,989,913.

(Continued)

(51) Int. Cl.
*G06T 7/80*     (2017.01)
*G06T 5/50*     (2006.01)
*G06T 7/90*     (2017.01)
*H04N 9/77*     (2006.01)
*H04N 23/76*    (2023.01)

(52) U.S. Cl.
CPC .............. *G06T 7/80* (2017.01); *G06T 5/50* (2013.01); *G06T 7/90* (2017.01); *H04N 9/77* (2013.01); *H04N 23/76* (2023.01); *G06T 2207/10024* (2013.01); *G06T 2207/10144* (2013.01)

(58) Field of Classification Search
CPC . G06T 2207/10024; G06T 2207/10144; G06T 5/50; G06T 7/80; G06T 7/90; H04N 17/002; H04N 23/76; H04N 9/77
See application file for complete search history.

(56) References Cited

U.S. PATENT DOCUMENTS 9,224,190 B2   12/2015   Moon et al.
9,516,290 B2   12/2016   Lin et al.
(Continued)

FOREIGN PATENT DOCUMENTS

CN   105844624 A   8/2016
CN   105844624 B   11/2018
(Continued)

OTHER PUBLICATIONS

International Search Report and Written Opinion of the International Searching Authority regarding International Patent Application No. PCT/KR2022/000628 dated May 3, 2022, 6 pages.

*Primary Examiner* — Zhiyu Lu

(57) ABSTRACT

A method includes obtaining a reference image frame and a non-reference image frame and generating a mask based on the reference image frame and the non-reference image frame. The method also includes determining a scaling coefficient and an offset coefficient for each of multiple color channels of the non-reference image frame based on pixels in the reference image frame and pixels in the non-reference image frame that are identified by the mask. The method further includes applying the scaling and offset coefficients to the non-reference image frame in order to generate a calibration-corrected non-reference image frame.

20 Claims, 7 Drawing Sheets

Related U.S. Application Data

(60) Provisional application No. 63/136,840, filed on Jan. 13, 2021.

(56) References Cited

U.S. PATENT DOCUMENTS

| | | |
|---|---|---|
| 9,866,727 B2 | 1/2018 | Wang et al. |
| 10,664,960 B1 | 5/2020 | Lee |
| 2015/0195441 A1 | 7/2015 | Chen et al. |
| 2015/0350513 A1 | 12/2015 | Zhang et al. |
| 2017/0358092 A1 | 12/2017 | Bleibel et al. |
| 2017/0359534 A1 | 12/2017 | Li et al. |
| 2023/0325999 A1 | 10/2023 | Dong et al. |

FOREIGN PATENT DOCUMENTS

| | | |
|---|---|---|
| CN | 109479098 A | 3/2019 |
| CN | 110163188 A | 8/2019 |
| CN | 109218613 B | 8/2020 |
| CN | 112132769 A | 12/2020 |
| CN | 113994366 A | 1/2022 |
| JP | 2017085407 A | 5/2017 |
| JP | 2019176305 A | 10/2019 |
| KR | 20080099731 A | 11/2008 |

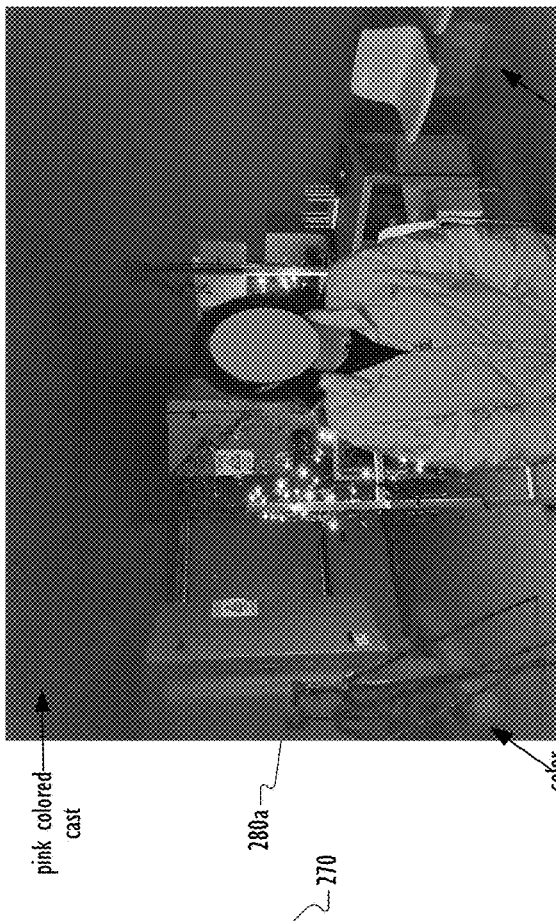
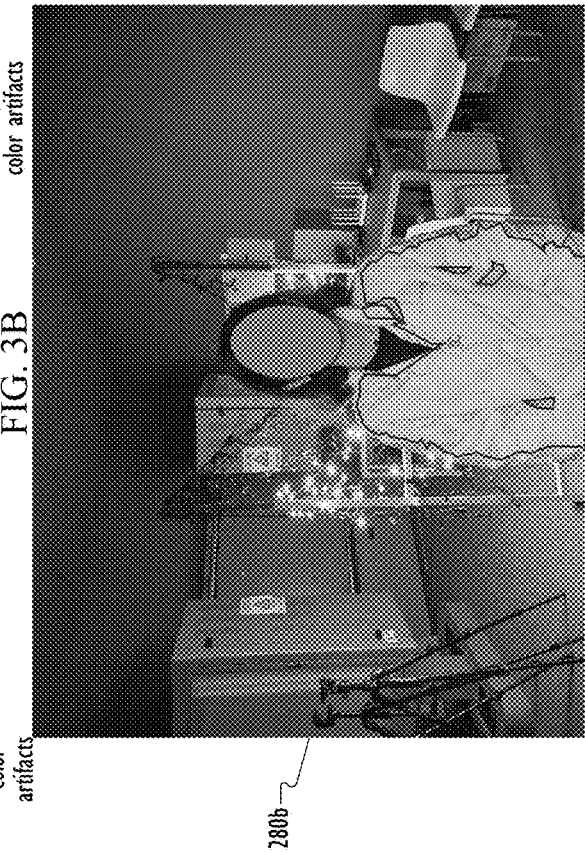
FIG. 3B
FIG. 3C
FIG. 3A

DYNAMIC CALIBRATION CORRECTION IN MULTI-FRAME, MULTI-EXPOSURE CAPTURE

CROSS-REFERENCE TO RELATED APPLICATIONS

This application claims priority under 35 U.S.C. § 120 as a continuation of U.S. patent application Ser. No. 17/573,031 filed on Jan. 11, 2022, which claims priority under 35 U.S.C. § 119(e) to U.S. Provisional Patent Application No. 63/136,840 filed on Jan. 13, 2021, Both of these earlier applications are hereby incorporated by reference in their entirety.

TECHNICAL FIELD

This disclosure relates generally to image processing. More specifically, this disclosure relates to a method for dynamic calibration correction in multi-frame, multi-exposure capture in a camera system.

BACKGROUND

With the popularity of mobile devices that include digital cameras, almost everyone can take a picture at any time. As the quality of the camera hardware in mobile devices has improved, users have begun to expect high quality photos from their devices. However, the camera hardware in mobile devices still has significant limitations, such as poor low light performance. In a multi-frame, multi-exposure camera system, the same sensor calibration setting is applied to all frames, regardless of their individual exposure. In other words, frames at different exposures are calibrated using a single set of settings (black level subtraction (BLS), white balance (WB), lens-shading corrected (LSC), etc.), which set is calibrated for default, standard exposure value EV0. In many cases, this single set of settings is an inadequate incorrect calibration for shortly exposed frames ("short frames"), and results in strong color/level-shilling of the short frames after digital gains are applied to the shortly exposed frames. The color/level shifting manifests in the final output of a multi-frame image processing system as blending artifacts.

SUMMARY

Embodiments of the present disclosure provide a method for dynamic calibration correction in multi-frame, multi-exposure capture in a camera system.

In one embodiment, a method includes obtaining a reference image frame and a non-reference image frame and generating a mask based on the reference image frame and the non-reference image frame. The method also includes determining a scaling coefficient and an offset coefficient for each of multiple color channels of the non-reference image frame based on pixels in the reference image frame and pixels in the non-reference image frame that are identified by the mask. The method further includes applying the scaling and offset coefficients to the non-reference image frame in order to generate a calibration-corrected non-reference image frame.

In another embodiment, an electronic device includes a processor and a memory storing instructions. The instructions, when executed by the processor, cause the processor to obtain a reference image frame and a non-reference image frame and generate a mask based on the reference image frame and the non-reference image frame. The instructions, when executed by the processor, also cause the processor to determine a scaling coefficient and an offset coefficient for each of multiple color channels of the non-reference image frame based on pixels in the reference image frame and pixels in the non-reference image frame that are identified by the mask. The instructions, when executed by the processor, further cause the processor to apply the scaling and offset coefficients to the non-reference image frame in order to generate a calibration-corrected non-reference image frame.

In yet another embodiment, a non-transitory machine readable medium contains instructions that when executed cause a processor to obtain a reference image frame and a non-reference image frame and generate a mask based on the reference image frame and the non-reference image frame. The non-transitory machine readable medium also contains instructions that when executed cause the processor to determine a scaling coefficient and an offset coefficient for each of multiple color channels of the non-reference image frame based on pixels in the reference image frame and pixels in the non-reference image frame that are identified by the mask. The non-transitory machine readable medium further contains instructions that when executed cause the processor to apply the scaling and offset coefficients to the non-reference image frame in order to generate a calibration-corrected non-reference image frame.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a genetic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMI)), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a gaming console (such as an XBOX, PLAYSTATION, or NINTENDO), a smart speaker or speaker with an integrated digital assistant (such as SAMSUNG GALAXY HOME, APPLE HOMEPOD, or AMAZON ECHO), an electronic dictionary, an electronic key, a camcorder, or an electronic picture frame.

Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3A illustrates an output image with dynamic calibration correction in accordance with an embodiment of this disclosure;

FIGS. 3B and 3C illustrate examples of unstable output images without dynamic calibration correction;

DETAILED DESCRIPTION

FIGS. 1 through 5B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Figure 1:
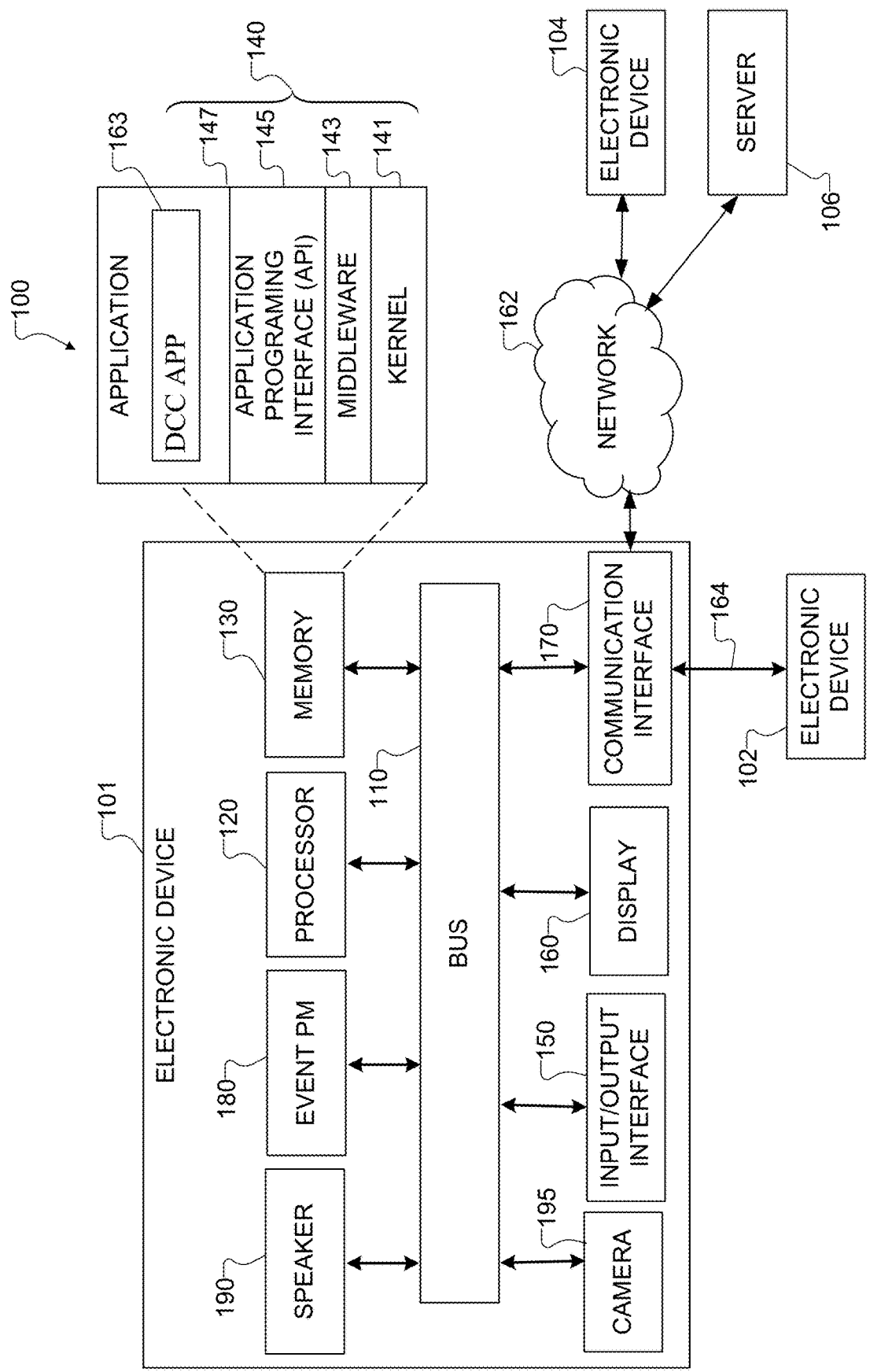
FIG. 1 illustrates an example network configuration including an electronic device in accordance with various embodiments of this disclosure.

FIG. 1 illustrates an example network configuration 100 in accordance with this disclosure. The embodiment of the network configuration 100 shown in FIG. 1 is for illustration only. Other embodiments could be used without departing from the scope of this disclosure. As shown in FIG. 1, according to embodiments of this disclosure, an electronic device 101 is included in the network configuration 100. The electronic device 101 may include at least one of a bus 110, a processor 120, a memory 130, an input/output (I/O) interface 150, a display 160, a communication interface 170, or an event processing module 180. The electronic device 101 may also include a speaker 190 and camera 195. In some embodiments, the electronic device 101 may exclude at least one of the components or may add another component.

The bus 110 may include a circuit for connecting the components 120-180 with one another and transferring communications (such as control messages and/or data) between the components. The processor 120 may include one or more of a central processing unit (CPU), an application processor (AP), or a communication processor (CP). The processor 120 may perform control on at least one of the other components of the electronic device 101 and/or perform an operation or data processing relating to communication.

The memory 130 may include a volatile and/or non-volatile memory. For example, the memory 130 may store commands or data related to at least one other component of the electronic device 101. According to embodiments of this disclosure, the memory 130 may store software and/or a program 140. The program 140 may include, for example, a kernel 141, middleware 143, an application programming interface (API) 145, and/or an application program (or "application") 147. At least a portion of the kernel 141, middleware 143, or API 145 may be denoted an operating system (OS) The applications 147 include a dynamic calibration correction in multi-frame, multi-exposure capture application 163 ("DCC app" 163), which is described more particularly below.

The kernel 141 may control or manage system resources (such as the bus 110, processor 120, or memory 130) used to perform operations or functions implemented in other programs (such as the middleware 143, API 145, or application program 147). The kernel 141 may provide an interface that allows the middleware 143, API 145, or application 147 to access the individual components of the electronic device 101 to control or manage the system resources. The middleware 143 may function as a relay to allow the API 145 or the application 147 to communicate data with the kernel 141, for example. A plurality of applications 147 may be provided. The middleware 143 may control work requests received from the applications 147, such as by allocating the priority of using the system resources of the electronic device 101 (such as the bus 110, processor 120, or memory 130) to at least one of the plurality of applications 147. The API 145 is an interface allowing the application 147 to control functions provided from the kernel 141 or the middleware 143. For example, the API 133 may include at least one interface or function (such as a command) for file control, window control, image processing, or text control.

The input/output interface 150 may serve as an interface that may, for example, transfer commands or data input from a user or other external devices to other component(s) of the electronic device 101. Further, the input/output interface 150 may output commands or data received from other component(s) of the electronic device 101 to the user or the other external devices.

The display 160 may include, for example, a liquid crystal display (LCD), a light emitting diode (LED) display, an organic light emitting diode (OLED) display, a microelectromechanical systems (MEMS) display, or an electronic paper display. The display 160 can also be a depth-aware display, such as a multi-focal display. The display 160 may display various contents (such as text, images, videos, icons, or symbols) to the user. The display 160 may include a touchscreen and may receive, for example, a touch, gesture, proximity, or hovering input using an electronic pen or a body portion of the user.

The communication interface 170 may set up communication between the electronic device 101 and an external electronic device (such as a first electronic device 102, a second electronic device 104, or a server 106). For example, the communication interface 170 may be connected with a network 162 or 164 through wireless or wired communication to communicate with the external electronic device.

The first external electronic device 102 or the second external electronic device 104 may be a wearable device or an electronic device 101-mountable wearable device (such as a head mounted display (HMD)). When the electronic device 101 is mounted in an HMD (such as the electronic device 102), the electronic device 101 may detect the mounting in the MID and operate in a virtual reality mode. When the electronic device 101 is mounted in the electronic device 102 (such as the HMD), the electronic device 101 may communicate with the electronic device 102 through the communication interface 170. The electronic device 101 may be directly connected with the electronic device 102 to communicate with the electronic device 102 without involving with a separate network.

The wireless communication may use at least one of, for example, long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. The wired connection may include at least one of, for example, universal serial bus (USB), high-definition multimedia interface (HDMI), recommended standard 232 (RS-232), or plain old telephone service (POTS). The network 162 may include at least one communication network, such as a computer network (like a local area network (LAN) or wide area network (WAN)), the Internet, or a telephone network.

The first and second external electronic devices 102 and 104 each may be a device of the same type or a different type from the electronic device 101. According to embodiments of this disclosure, the server 106 may include a group of one or more servers. Also, according to embodiments of this disclosure, all or some of the operations executed on the electronic device 101 may be executed on another or multiple other electronic devices (such as the electronic devices 102 and 104 or server 106). Further, according to embodiments of this disclosure, when the electronic device 101 should perform some function or service automatically or at a request, the electronic device 101, instead of executing the function or service on its own or additionally, may request another device (such as electronic devices 102 and 104 or server 106) to perform at least some functions associated therewith. The other electronic device (such as electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

The camera 195 enables the capture of photographs including frames at different exposures. More particularly, the camera 195 includes a multi-frame, multi-exposure camera system that simultaneously captures multiple frames of the same scene at different exposures. For example, the camera 195 could include the hardware, such as one or more lenses, a photodetector element, and other components used to convert light into a digital image. The camera 195 may additionally include specialized processors for performing various functions related to capturing photographs, or the camera 195 may use the processor 120 for these purposes.

As introduced above, the DCC app 163 utilizes multiple frames captured by the camera 165 at different exposures to generate a single output image that dynamically calibrates (or re-calibrates) a multi-frame processor (MFP). The MFP receives and blends two or more frames into a single final output image. The goal of the MFP is to combine the multiple frames received into an output image with reduced noise compared to the inputs. Dynamic calibration correction enables the MFP to generate stable output while consuming few computing resources. Without the dynamic calibration correction provided by the DCC app 163, a multi-frame, multi-exposure imaging system can be unstable due to the MFP exhibiting random bias in blending an EV0 frame with un-calibrated non-EV0 frames. The DCC app 163 enables the MFP to provide a higher dynamic range image with no blending artifacts compared to low-dynamic range images produced by the MFP without the DCC app 163.

While FIG. 1 shows that the electronic device 101 includes the communication interface 170 to communicate with the external electronic device 102 or 104 or server 106 via the network(s) 162 and 164, the electronic device 101 may be independently operated without a separate communication function, according to embodiments of this disclosure. Also, note that the electronic device 102 or 104 or the server 106 could be implemented using a bus, a processor, a memory, I/O interface, a display, a communication interface, and an event processing module (or any suitable subset thereof) in the same or similar manner as shown for the electronic device 101.

The server 106 may operate to drive the electronic device 101 by performing at least one of the operations (or functions) implemented on the electronic device 101. For example, the server 106 may include an event processing server module (not shown) that may support the event processing module 180 implemented in the electronic device 101. The event processing server module may include at least one of the components of the event processing module 180 and perform (or instead perform) at least one of the operations (or functions) conducted by the event processing module 180. The event processing module 180 may process at least part of the information obtained from other elements (such as the processor 120, memory 130, input/output interface 150, or communication interface 170) and may provide the same to the user in various manners.

In some embodiments, the processor 120 or event processing module 180 is configured to communicate with the server 106 to download or stream multimedia content, such as images, video, or sound. For example, a user operating the electronic device 101 can open an application or website to stream multimedia content. The processor 120 (or event processing module 180) can process and present information, via the display 160, to enable a user to search for content, select content, and view content. In response to the selections by the user, the server 106 can provide the content or record the search, selection, and viewing of the content, or both provide and record.

While the event processing module 180 is shown to be a module separate from the processor 120 in FIG. 1, at least a portion of the event processing module 180 may be included or implemented in the processor 120 or at least one other module, or the overall function of the event processing module 180 may be included or implemented in the processor 120 shown or another processor. The event processing module 180 may perform operations according to embodiments of this disclosure in interoperation with at least one program 140 stored in the memory 130.

Figure 2A:
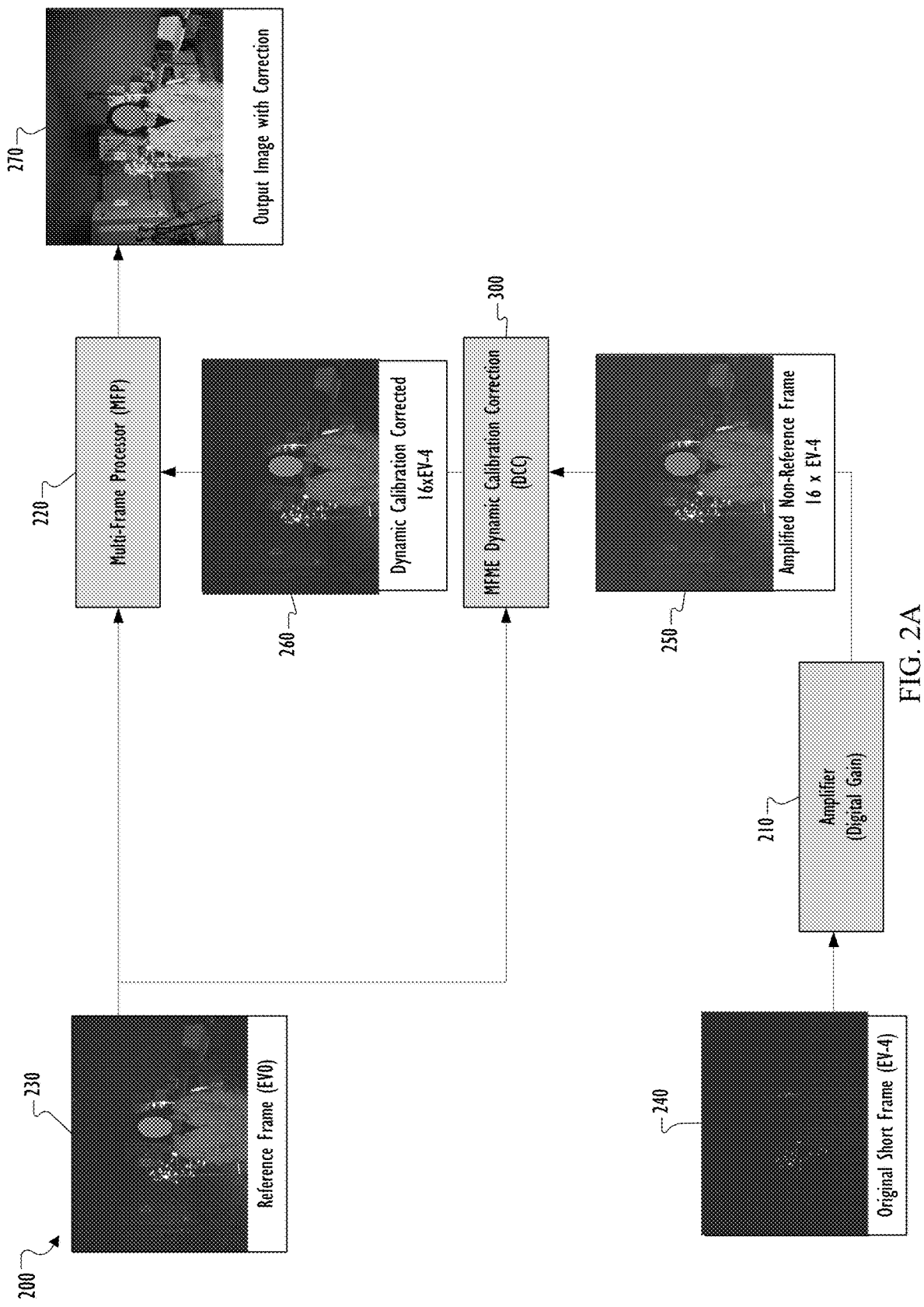
FIG. 2A illustrates a block diagram of dynamic calibration correction in a multi-frame, multi-exposure (MFME) capture camera system in accordance with an embodiment of this disclosure.

Although FIG. 1 illustrates one example of a network configuration 100, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system FIG. 2A illustrates a block diagram of dynamic calibration correction (DCC) in a multi-frame, multi-exposure (MFME) capture camera system 200 in accordance with an embodiment of this disclosure. The embodiment of the DCC in the MFME capture camera system 200 shown in FIG. 2A is for illustration only. Other embodiments of the DCC in the MFME capture camera system 200 could be used without departing from the scope of this disclosure. In certain embodiments, the MFME capture camera system 200 is the same as, or implemented by, camera 195.

The camera system 200 includes an amplifier 210 and a multi-frame processor 220. When the camera 165 captures an image of a scene, the camera 165 simultaneously captures a reference frame 230 and a non-reference frame 240. The reference frame 230 is captured at a standard exposure value (EV0) and the non-reference frame 240 is captured at a different exposure value, such as EV-4 or EV-2. The amplifier 210 receives the non-reference frame 240 as input. The amplifier 210 further, based on the input, generates and outputs an amplified non-reference frame 250 by applying a digital gain (for example, 4× or 16×) to the original non-reference frame 240. In the example shown in FIG. 2A, the original non-reference frame 240 is captured at an exposure value EV-4. The amplifier 210 applies a 16× digital gain. Based on the applied 16× digital gain, the amplified non-reference frame 250 may also be referred to as a 16×EV-4 frame. The camera 195 utilizes a shorter exposure duration at EV-4 compared to the standard exposure duration at EV0, and for simplicity, the original non-reference frame 240 captured at EV-4 is also referred to as the original "short frame." The shorter exposure duration at EV-4 causes the original short frame 240 to be dark (including darker pixels) as compared to the brighter reference frame 230.

In accordance with embodiments of this disclosure, the camera system 200 includes a DCC unit 300 that dynamically calibrates the MFP 220 by providing a calibration-corrected amplified non-reference frame 260 to the MFP 220. The DCC unit 300 includes DCC app 163, which performs the functions of the DCC app of FIG. 1. As inputs, the DCC unit 300 receives the reference frame 230 and the amplified non-reference frame 250. The function of the DCC unit 300 is described further with reference to FIG. 4.

The MFP 220 receives and blends the reference frame 230 and the calibration-corrected amplified non-reference frame 260 into a single output image 270. The output image 270 exhibits the correction provided by the DCC unit 300.

Although FIG. 2A illustrates an example DCC unit 300 in the MFME capture camera system 200, various changes may be made to FIG. 2A. For example, various components in FIG. 2A could be combined, further subdivided, or omitted and additional components could be added according to particular needs. As a particular example, the MFP 220 could incorporate the DCC unit 300.

Figure 2B:
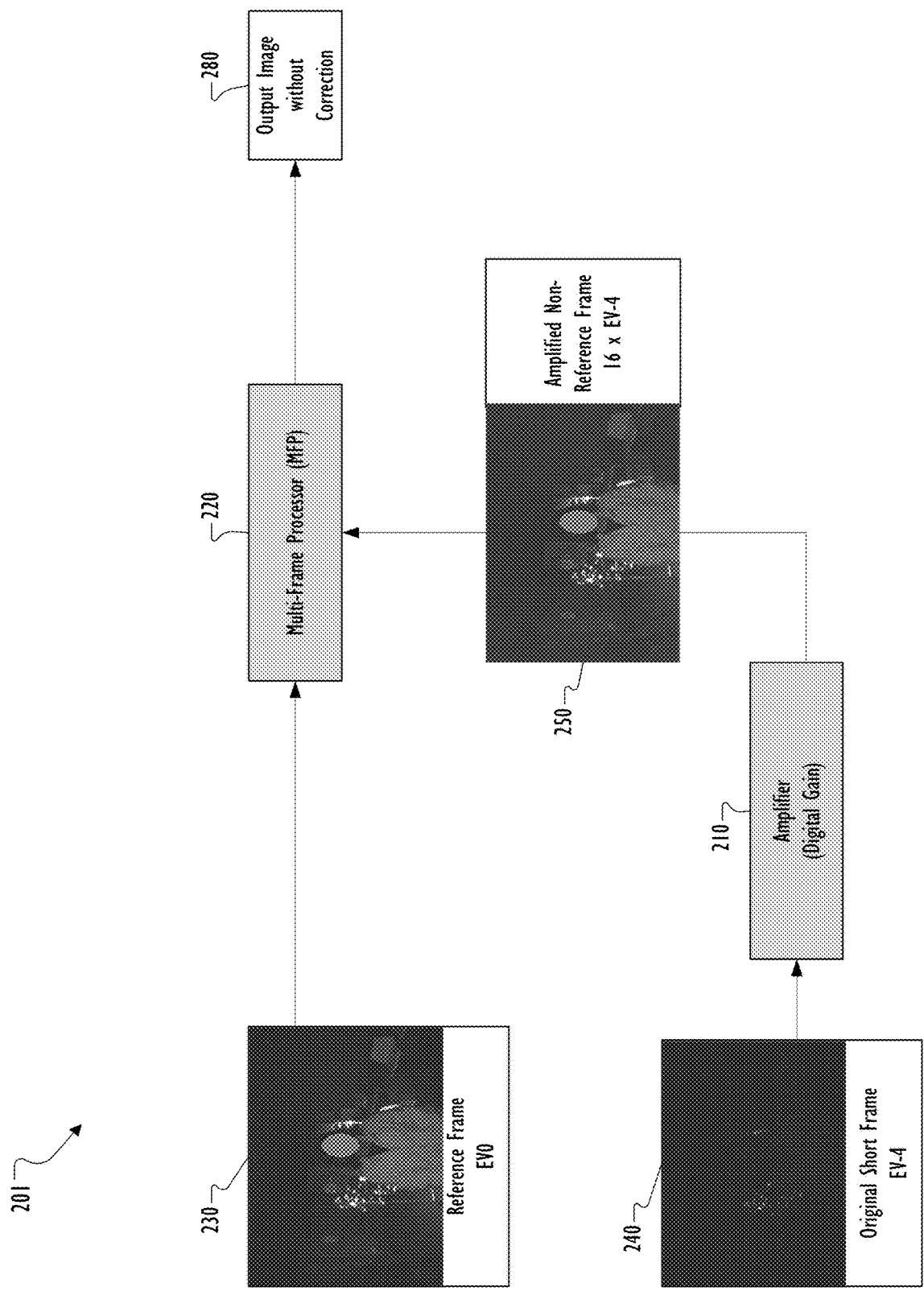
FIG. 2B illustrates a block diagram of a MFME capture camera system without the dynamic calibration correction.

FIG. 2B illustrates a block diagram of a DCC in the MFME capture camera system 201 without the dynamic calibration correction. FIG. 2B is provided for comparison to the technical advantages provided by the DCC unit 300 of FIG. 2A.

A MIME camera system 201 includes the amplifier 210 and the multi-frame processor 220. In certain embodiments, the MFME camera system 201 is the same as, or implemented by, camera 195. The MFP 220 receives and blends the reference frame 230 and the amplified non-reference frame 250 into a single output image 280. The MFME camera system 201 outputs an output image 280 that exhibits blending artifacts as a result of color/level-shifting after digital gain application on shortly exposed frames. Without the dynamic calibration correction provided by the DCC unit 300, the MFME camera system 201 can be unstable due to the MFP 220 exhibiting random bias in blending an EV0 frame with un-calibrated non-EV0 frames. That is, the output image 280, which is generated by the MFP 220 blending the reference image 230 with the amplified non-reference frame 250, can be a first unstable output image 280a, such as the example shown in FIG. 3B, or can be a second unstable output image 280b, such as the example shown in FIG. 3C. When the frame 250 that is used to calibrate the MFP 220 for reducing noise is inadequately calibrated for the EV0 reference frame 230, then the MFP 220 will produce a poor quality, unstable output image 280 (280a or 280b).

For ease of visibility, FIGS. 3A-3C provide larger views of the final output mage of the MFP 220. FIG. 3A illustrates the output image 270 with dynamic calibration correction in accordance with an embodiment of this disclosure. As shown in FIG. 3A, the DCC unit 300 enables the MFP 220 to generate stable output with minimal calibration effort for the input. For example, the minimal calibration effort can correspond to a consumption of few computing resources. In certain embodiments, the DCC unit 300 enables the MFP 220 to generate stable output with minimal off-line calibration effort for the input, where off-line calibration refers to calibration at the time of manufacture. FIGS. 3B and 3C illustrate examples of unstable output images 280a and 280b without dynamic calibration correction. In FIG. 3B, the output image 280a exhibits color artifacts in the final output from the MFP 220 due to incorrect calibration of short exposure frames. The color artifacts exhibited can include color casting such as a pink colored cast. In FIG. 3C, the output image 280b exhibits bright colored pixels (within the outline 282) on the person's white jacket where the reference frame 230 includes white pixels that represent the actual color of the person's jacket.

Figure 4:
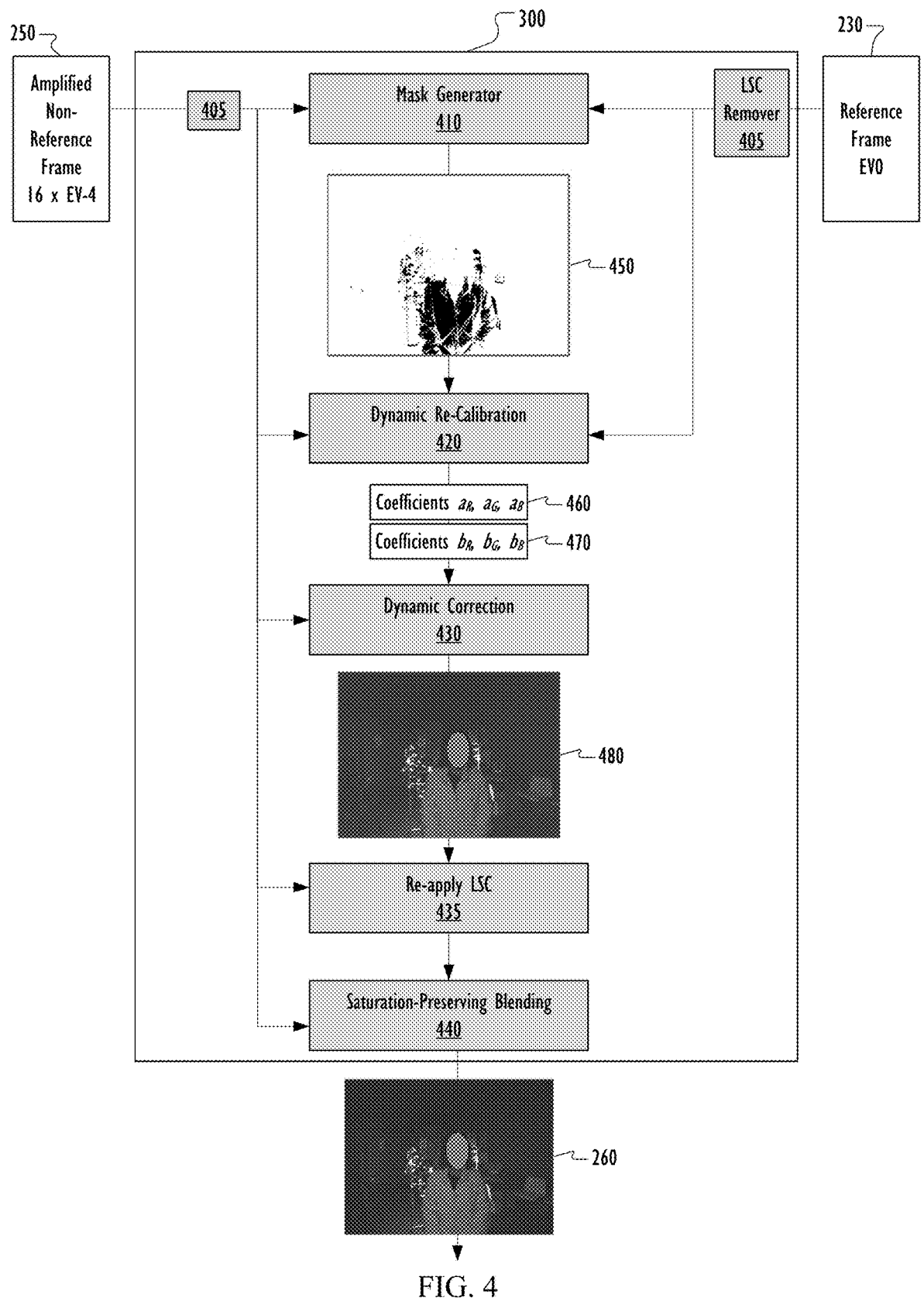
FIG. 4 illustrates a block diagram of additional details of the MFME dynamic calibration correction unit in accordance with an embodiment of this disclosure.

FIG. 4 illustrates a block diagram of additional details of the MFME dynamic calibration correction unit 300 in accordance with an embodiment of this disclosure. The embodiment of the DCC unit 300 shown in FIG. 4 is for illustration only. Other embodiments of the DCC unit 300 could be used without departing from the scope of this disclosure.

It is expensive and laborious to calibrate different settings for different frames in a multi-frame, multi-exposure system. As a technical solution, the DCC unit 300 performs dynamic/online re-calibration correction of shortly exposed frames on the fly. That is, the DC unit 300 can perform the dynamic/online re-calibration correction within the time the reference and original short frames 230 and 240 are captured to the time of outputting the calibration-corrected frame 260. The DCC unit 300 provides technical advantages in which runtime re-calibration of a black offset and/or color correction matrix for lower exposure frames uses information from the higher exposure frame, and runtime correction of lower exposure frames uses information from the higher exposure frame. The DCC unit 300 implements a method that uses information from standard exposure value EV0 frames to estimate the correction needed to apply on non-EV0/shortly exposed frames. The DCC unit 300 includes a mask generator 410, a dynamic re-calibrator 420, a dynamic corrector 430, and a saturation-preserving blender 440. In some embodiments, the DCC unit 300 also includes at least one lens shading correction remover 405 and a lens shading correction re-applicator 435.

The DCC unit 300 detects whether the reference frame 230 or the amplified non-reference frame 250 includes lens-shading corrected (ESC) data. The lens shading correction remover 405 removes LSC data detected in the reference frame 230 and removes LSC data detected in the amplified non-reference frame 250.

The mask generator 410 receives the reference frame 230 and the amplified non-reference frame 250 as inputs. In some embodiments, the mask generator 410 receives the reference frame and the amplified non-reference frame that no longer contain LSC data from the lens shading correction remover 405. The mask generator 410 generates a mask 450 based on the received reference frame and the amplified non-reference frame. The mask 450 is a binary image in which white pixels indicate locations that are used for subsequent linear or non-linear estimation. The black pixels of the mask 450 represent pixel locations where the reference frame includes a saturated, white pixels that may be excluded from linear or non-linear estimation the dynamic re-calibrator 420 performs. A white pixel has the value 255 at each of the R, G, and B channels. Each mask represents the luma components of an image from which the chroma components have been removed. In some embodiments, the mask 450 is defined by Equation 1 based on the intersection of the luma-based masks of the reference frame 230 and the amplified non-reference frame 250. That is, the location of a white pixel in the mask 450 indicates that a white pixel is at the same location in both the luma-based mask of the reference frame 230 and the luma-based mask of the amplified non-reference frame 250.

$$\text{mask} = \text{mask}_{ref} \cdot \text{mask}_{nonRef} \quad (1)$$

To generate the mask 450, the mask generator 410 computes a reference mask ($\text{mask}_{ref}$) based on luma of the reference frame in accordance with Equation 2 and computes a non-reference mask ($\text{mask}_{nonRef}$) based on luma of the amplified non-reference frame in accordance with Equation 3. More particularly, the mask generator 410 computes the reference mask is based on a comparison of a reference luma threshold ($\text{threshold}_{ref}$) to the luma ($\text{luma}_{ref}$) of the reference frame. Similarly, the mask generator 410 computes the non-reference mask based on a comparison of a non-reference lama threshold ($\text{threshold}_{NonRef}$) to the luma ($\text{luma}_{ref}$) of the amplified non-reference frame 250. In some embodiments, the luma threshold ($\text{threshold}_{ref}$ or $\text{threshold}_{NonRef}$) indicates a designer-specified value (e.g., less than 255) above which the pixel value is considered saturated.

$$\text{mask}_{ref} = \text{luma}_{ref} \leq \text{threshold}_{ref} \quad (2)$$

$$\text{mask}_{NonRef} = \text{luma}_{NonRef} \leq \text{threshold}_{NonRef} \quad (3)$$

In the embodiment shown FIG. 4, the mask generator 410 computes the luma of the amplified non-reference frame by averaging R, G, and B channels of the amplified non-reference frame. The mask generator 410 computes the luma of the reference frame by averaging R, G, and B channels of the reference frame. It is understood that this disclosure is not limited to image processing in the red-green-blue (RGB) domain (including R, G, and B channels), and that embodiments of this disclosure include image processing in other domains that include a number of channels. For example, some embodiments of this disclosure include processing images according to a number of channels of a Bayer domain.

The dynamic re-calibrator 420 receives the mask 450, the reference frame 230, and the amplified non-reference frame 250 as inputs. Based on the inputs 230, 250, and 450, the dynamic re-calibrator 420 estimates a scaling coefficient (a) and an offset coefficient (b) for each of a number of channels in the domain (e.g., RGB, Bayer, etc.) corresponding to received frames (i.e., reference frame 230 and amplified non-reference frame 250). For example, the dynamic re-calibrator 420 estimates a scaling coefficient $a_R$, $a_G$, and $a_B$ corresponding to each of the R, G, and B channels in the RGB domain, respectively. Also, the dynamic re-calibrator 420 estimates an offset coefficient $b_R$, $b_G$, and $b_B$ corresponding to each of the R, G, and B channels in the RGB domain, respectively. To generate the scaling and offset coefficients, the dynamic re-calibrator 420 selects pixel locations from the mask 450 where a pixel is white. Each pixel location in the mask 450 corresponds to a pair of pixels (r, n) at an identical pixel location in the reference frame 230 and amplified non-reference frame 250. In certain embodiments, the dynamic re-calibrator 420 estimates the scaling and offset coefficients by applying a noisy linear model to the pairs of pixels at the selected locations. The noisy linear model defines the relationship between pixels (r) in the reference frame 230 and pixels (n) in the amplified non-reference frame 250 that are at the selected pixel locations. An example noisy linear model is defined by Equation 4, where ε represents noise. The dynamic re-calibrator 420 fits the linear model to the pair of pixels (r, n). In certain embodiments, the dynamic re-calibrator 420 estimates the scaling and offset coefficients based on a specified objective, such as the objective defined by Equation 5. The specified objective is applied to each of the R, G, and B channels. The specified objective can be a matching criterion. In Equation 5, the sum of the total square error between the pair of pixels (r, n) is minimized while solving to determine scaling and offset coefficients a and b.

$$r = (a \cdot n + b + \varepsilon)^2 \quad (4)$$

$$\text{objective} = \min_{a,b} \sum_{r,n} (r - a \cdot n - b)^2 \quad (5)$$

The dynamic corrector 430 receives and the scaling and offset coefficients ({$a_R$ and $b_R$}, {$a_G$ and $b_G$}, and {$a_B$ and $b_B$}) from the dynamic re-calibrator 420 and the amplified non-reference frame 250 as inputs. The dynamic corrector 430 generates an intermediate calibration-correction (ICC) frame 480 by applying a calibration correction model to the amplified non-reference frame 250 for each of the R, G, and B channels. The calibration correction/regression model can be a linear calibration correction model or a non-linear calibration correction model. For ease of explanation, the DCC unit 330 will be described as applying a linear calibration correction model in which each of the R, G, and B channels of the amplified non-reference frame 250 has a corresponding scaling coefficient applied as a multiplier and a corresponding offset coefficient applied as an addition. Particularly, the dynamic corrector 430 multiplies a first scaling coefficient $a_R$ by the first channel, such as the R channel, of the amplified non-reference frame 250 and adds the first offset coefficient $b_R$ to the resulting product. Additionally, the dynamic corrector 430 multiplies a second scaling coefficient $a_G$ by the second channel, such as the G channel of the amplified non-reference frame 250 and adds the second offset coefficient $b_G$, and analogously applies the third scaling and offset coefficients $a_B$ and $b_B$ to the third channel, such as the B channel, of the amplified non-reference frame 250. After applying the calibration correction model, the saturation area of the ICC frame 480 might be distorted. That is, the ICC frame 480 is a linear calibration-corrected non-reference frame, which includes calibration correction without saturation preservation. To preserve the saturation area, these distortion areas are detected and the blended back into the ICC frame 480 by the saturation-preserving blender 440.

The DCC unit 300 applies the linear calibration correction model on linear data. In certain embodiments, the DCC unit 300 prevents application f the linear calibration correction model onto lens-shading corrected (ESC) data. Particularly, if the reference and non-reference frames 230 and 250 are lens-shading corrected, then the lens shading correction remover 405 removes the LSC data from both the reference and non-reference frames 230 and 250 before the mask generator 410 generates the mask 450, and the lens shading correction re-applicator 435 re-applies LSC data onto the ICC frame 480, but before the saturation-preserving blender 440 performs saturation-preserving blending.

The saturation-preserving blender 440 preserves a saturation area of the amplified non-reference frame 250 by detecting the saturation area of the amplified non-reference frame 250, and blending the detected saturation area into the calibration-corrected amplified non-reference frame. To detect the saturation area, the saturation-preserving blender 440 generates a saturation map (satMap) based on a saturation threshold value (satThr) and saturation slope (satSlope). Particularly, the saturation-preserving blender 440 generates a saturation map (satMap) by suppressing, at each pixel(s) in the amplified short frame 250, the highest value ($\max_{RGB}$) from among the R, G, B values. The saturation threshold value is a designer-specified value, such as the value 200. The saturation slope is designer-specified value, such as the value 50, which smooths the transition from saturation to non-saturation. The saturation-preserving blender 440 generates the calibration-corrected amplified non-reference frame 260 by blending the amplified short frame 250 (ShortFrame) with the ICC frame 480 ($\text{nonRef}_{corrected}$), using the saturation reap. That is, under the guidance of the saturation map, the saturation-preserving blender 440 preserves a saturation area of the amplified non-reference frame 250 by combining the non-reference frame without (prior to) calibration correction together with the ICC frame 480 with (after applying) calibration correction. For each pixel represented in the saturation map, the satMap value that is greater than or equal to zero (0) and less than or equal to one (1). In certain embodiments, saturation-preserving blender 440 generates a saturation map defined by Equation 6. The saturation-preserving blender 440 generates and outputs the calibration-corrected amplified non-reference frame 260 in accordance with Equation 7.

$$sat\text{Map} = \max\left(0, \min\left(1, \frac{\max_{RGB}(s) - satThr}{sat\text{Slope}}\right)\right) \quad (6)$$

$$\text{output} = sat\text{Map} \cdot \text{Short Frame} + (1 - sat\text{Map}) \cdot \text{nonRef}_{corrected} \quad (7)$$

Although FIG. 4 illustrates an example of a DCC unit 300, various changes may be made to FIG. 4. For example, various components in FIG. 4 could be combined, further subdivided, or omitted and additional components could be added according to particular needs. As a particular example, the lens shading correction re-applicator 435 and saturation-preserving blender 440 may be combined.

Figure 5A:
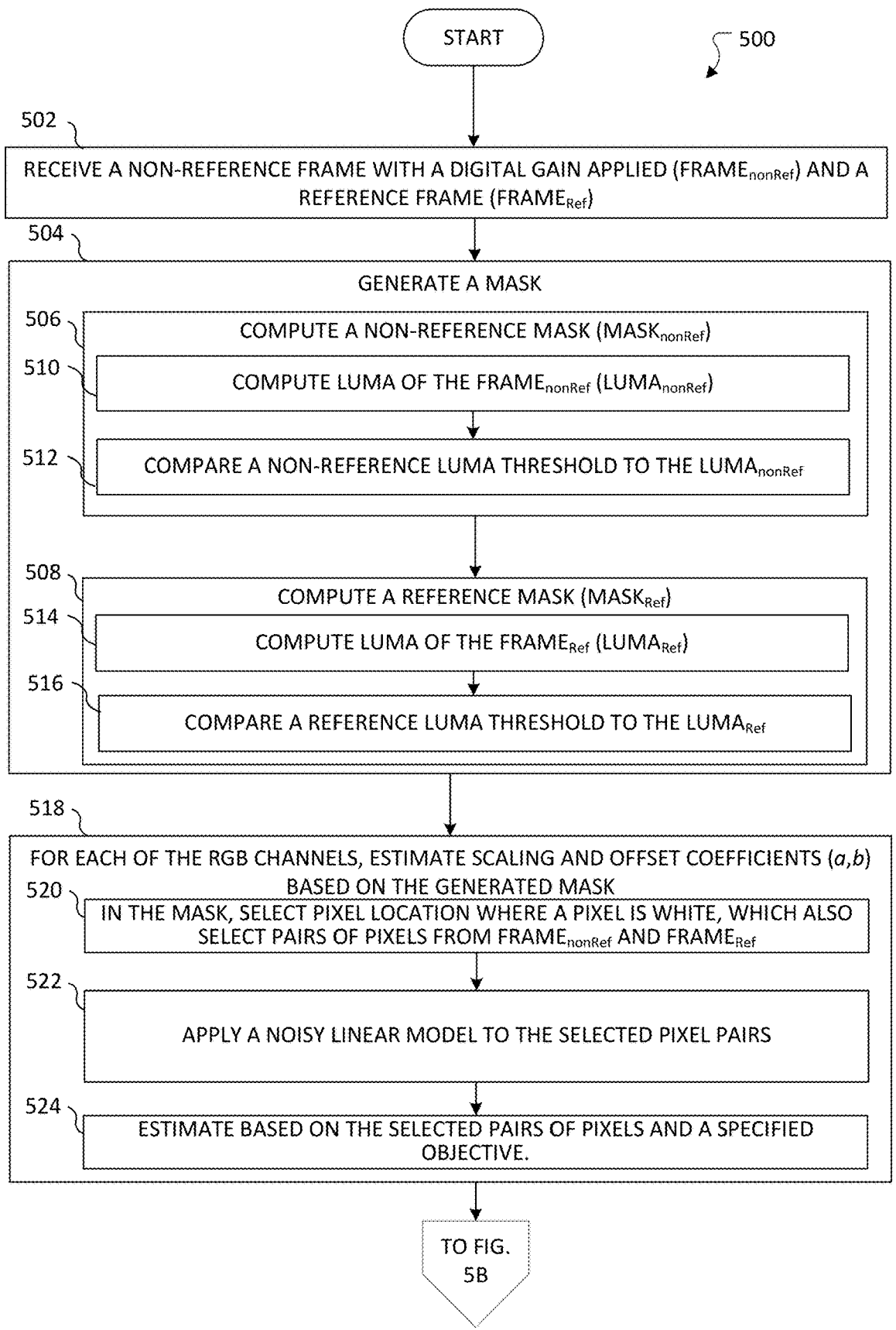
FIGS. 5A and 5B illustrate a method for dynamic calibration correction in multi-frame, multi-exposure capture in a camera system in accordance with an embodiment of this disclosure.
Figure 5B:
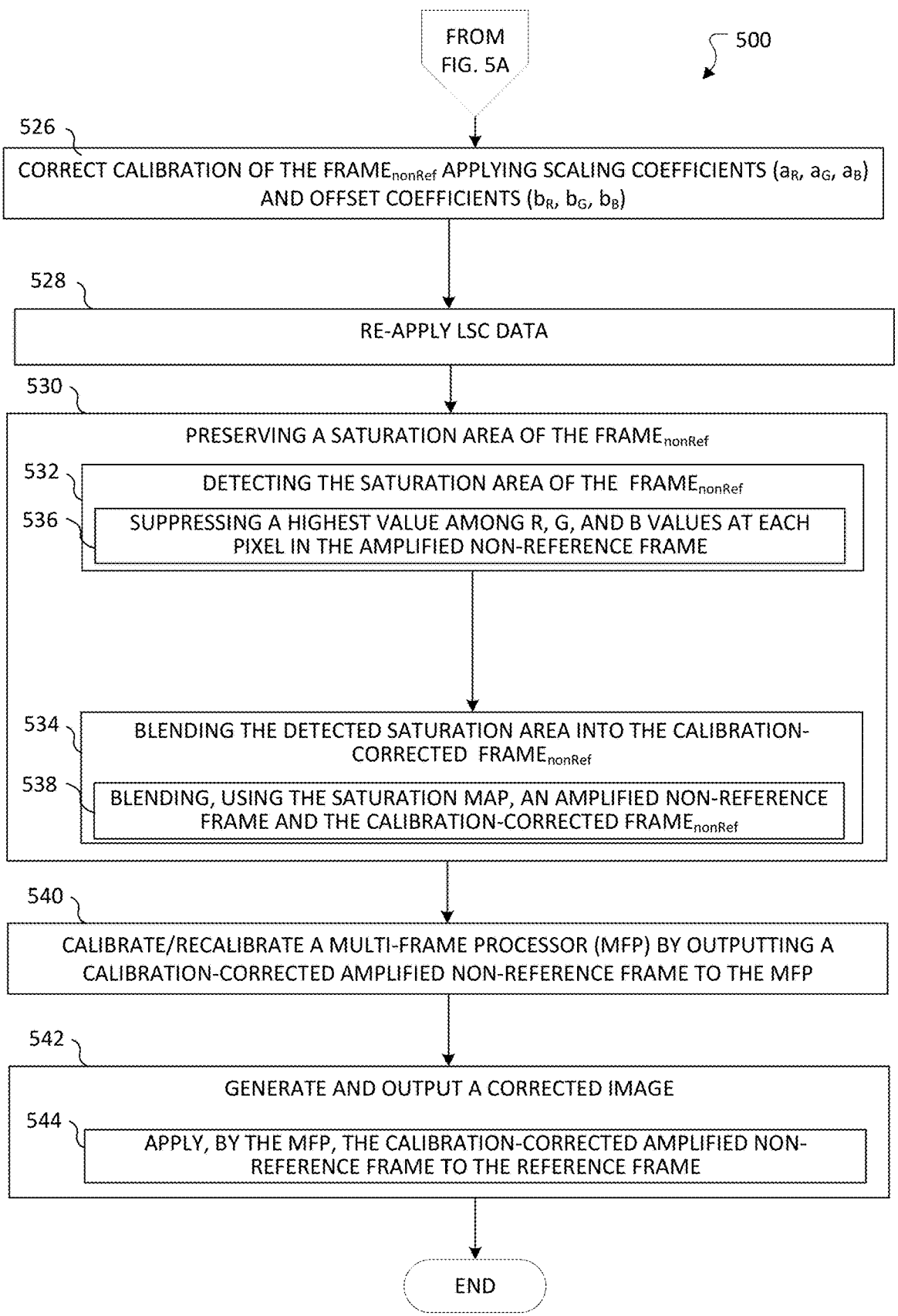

FIGS. 5A and 5B illustrate a method for dynamic calibration correction in multi-frame, multi-exposure capture in a camera system in accordance with an embodiment of this disclosure. The method 500 is implemented by an electronic device 101 that includes the DCC unit 300. More particularly, the method 500 could be performed by a processor 120 of the electronic device 101 executing the DCC app 163. For ease of explanation, the method 500 is described as being performed by the processor 120.

In operation 502, the processor 120 receives a non-reference frame with a digital gain applied and a reference frame as inputs. For simplicity of illustration, $\text{Frame}_{Ref}$ represents the reference frame 230, and $\text{Frame}_{nonRef}$ represents the amplified non-reference frame 250. In operation 504, a mask 450 is generated using the mask generator 410. More particularly, to generate the mask 450, the processor 120 computes a non-reference mask (at block 506) and computes a reference mask (at block 508). In operation 512, the processor 120 computes the non-reference mask by computing the lama ($\text{luma}_{NonRef}$) of the amplified non-reference frame 250 and comparing, in operation 512, a non-reference luma threshold ($\text{threshold}_{NonRef}$) to the (ma of the amplified non-reference frame 250. To compute the reference mask, the processor 120, in operation 514, first computes the luma ($\text{luma}_{ref}$) of the reference frame 230 and, in operation 516, compares a reference luma threshold ($\text{threshold}_{ref}$) to the luma of the reference frame 230 (at block 516). In certain embodiments, computing the luma of a frame (e.g., $\text{luma}_{NonRef}$ or $\text{luma}_{ref}$ respectively) includes computing the average of the R, G, and B channels of the frame (e.g., amplified non-reference frame 250 or reference frame 230, respectively). For example, computing the average of the channels includes computing the sum of the R, G, and B channels at each pixel in the frame, and divide by the number of channels (e.g., 3). In certain embodiments, the luma of an RGB image can be computed according to other methods.

In operation 518, for each of the RGB channels, the processor 120 estimates scaling and offset coefficients (a, b) based on the generated mask 450. More particularly, operation 518 includes the operations 520, 522, and 524. In operation 520, a pixel location in the mask 450 is selected where a pixel is white. When selecting the pixel location in the mask, the processor 120 also selects the corresponding pair of pixels (r, n) at the identical pixel location in the reference and amplified-non reference frames 230 and 250. That is, the selection of the pixel location also results in the selection of the pair of pixels (r, n). In operation 522, the processor 120 applies a noisy linear model to the pairs of pixels. In operation 524, the processor 120 estimates the coefficients based on the selected pairs of pixels (r, n) and a selected objective (e.g.; matching criteria).

In operation 526, the calibration of the amplified non-reference frame 250 is corrected by applying the scaling coefficients ($a_R$, $a_G$, and $a_B$) and the offset coefficients ($b_R$, $b_G$, and $b_B$). More particularly, the processor 120 corrects the calibration of the amplified non-reference frame 250 by using the dynamic corrector 430 to generate the ICC frame 480.

In operation 528, the processor 120 re-applies LSC data to intermediate calibration-corrected frame 480 that no longer contain the LSC data that was removed by the lens shading correction remover 405.

In operation 530, a saturation area of the amplified non-reference frame 250 is preserved. More particularly, to preserve the saturation area, the processor 120 can detect the saturation area of the amplified non-reference frame 250 (at block 532), and blend the detected saturation area into the calibration-corrected non-reference frame referred to as ICC frame 480 (at block 534). In certain embodiments, detecting the saturation area includes, in operation 536, in suppressing a highest value among R, G, and B values at each pixel in the amplified short frame 250. That is, to detect the saturation area, the processor 120 can suppress the highest values at each pixel. In certain embodiments, blending the detected saturation area into the ICC frame 480 includes operation 538, in which the processor 120 uses the saturation map to blend the amplified short frame 250 and the calibration-corrected non-reference frame referred to as ICC frame 480.

In operation 540, the processor 120 calibrates or re-calibrates a multi-frame processor 220 (MFP) by outputting the calibration-corrected amplified non-reference frame 260 to the MFP 220. That is, the calibration-corrected amplified non-reference frame 260, when received by the MFP 220, configures the MFP 220 with correct calibration.

In operation 542, the MFP 220 generates and outputs a corrected image, which is referred to as the output image 270. To generate the output image 270, in operation 544, the MFP 220 applies a correct calibration received from the DCC unit 300 to the reference frame 230 by blending the received calibration-corrected amplified non-reference frame 260 into the reference frame 230.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method performed by an electronic device, the method comprising:
   obtaining, from at least one memory of the electronic device, a reference image frame and a non-reference image frame;
   generating, by at least one processor of the electronic device, a mask based on the reference image frame and the non-reference image frame;
   determining, by the at least one processor, a scaling coefficient and an offset coefficient for each of multiple color channels of the non-reference image frame based on pixels in the reference image frame and pixels in the non-reference image frame that are identified by the mask; and
   applying, by the at least one processor, the scaling and offset coefficients to the non-reference image frame in order to generate a calibration-corrected non-reference image frame.

2. The method of claim 1, further comprising:
   blending the reference image frame and the calibration-corrected non-reference image frame to generate an output image of a scene.

3. The method of claim 1, wherein:
   the reference image frame is associated with a first exposure duration; and
   the non-reference image frame is associated with a second exposure duration that is shorter than the first exposure duration.

4. The method of claim 1, wherein generating the mask comprises:
   generating a reference mask based on the reference image frame and a reference luma threshold;
   generating a non-reference mask based on the non-reference image frame and a non-reference luma threshold; and
   determining an intersection of the reference mask and the non-reference mask.

5. The method of claim 1, wherein determining the scaling coefficient and the offset coefficient for each of the color channels of the non-reference image frame comprises:
   identifying pairs of pixels based on the mask, each pair of pixels including one of the pixels of the reference image frame and one of the pixels of the non-reference image frame;
   fitting a noisy model to the pairs of pixels; and
   using an objective function that includes the model to determine the scaling coefficients and the offset coefficients.

6. The method of claim 1, further comprising:
   detecting a saturation area of the non-reference image frame; and
   blending the detected saturation area into the calibration-corrected non-reference image frame.

7. The method of claim 6, further comprising:
   removing lens-shading corrected (LSC) data from at least one of the reference image frame or the non-reference image frame, the mask based on the reference image frame and the non-reference image frame that do not contain the LSC data; and
   re-applying the LSC data to the calibration-corrected non-reference image frame prior to blending the detected saturation area into the calibration-corrected non-reference image frame.

8. The method of claim 6, wherein:
   detecting the saturation area comprises suppressing a highest value among the color channels at each pixel location in the non-reference image frame and generating a saturation map; and blending the detected saturation area into the calibration-corrected non-reference image frame comprises blending the non-reference image frame and the calibration-corrected non-reference image frame based on the saturation map.

9. An electronic device comprising:
at least one processor; and
at least one memory storing instructions that, when executed by the at least one processor, cause the at least one processor to:
obtain a reference image frame and a non-reference image frame;
generate a mask based on the reference image frame and the non-reference image frame;
determine a scaling coefficient and an offset coefficient for each of multiple color channels of the non-reference image frame based on pixels in the reference image frame and pixels in the non-reference image frame that are identified by the mask; and
apply the scaling and offset coefficients to the non-reference image frame in order to generate a calibration-corrected non-reference image frame.

10. The electronic device of claim 9, the at least one memory further storing instructions that, when executed by the at least one processor, cause the at least one processor to blend the reference image frame and the calibration-corrected non-reference image frame to generate an output image of a scene.

11. The electronic device of claim 9, wherein:
the reference image frame is associated with a first exposure duration; and
the non-reference image frame is associated with a second exposure duration that is shorter than the first exposure duration.

12. The electronic device of claim 9, wherein the instructions that when executed cause the at least one processor to generate the mask comprise:
instructions that when executed cause the at least one processor to:
generate a reference mask based on the reference image frame and a reference luma threshold;
generate a non-reference mask based on the non-reference image frame and a non-reference luma threshold; and
determine an intersection of the reference mask and the non-reference mask.

13. The electronic device of claim 9, wherein the instructions that when executed cause the at least one processor to determine the scaling coefficient and the offset coefficient for each of the color channels of the non-reference image frame comprise:
instructions that when executed cause the at least one processor to:
identify pairs of pixels based on the mask, each pair of pixels including one of the pixels of the reference image frame and one of the pixels of the non-reference image frame;
fit a noisy model to the pairs of pixels; and
use an objective function that includes the model to determine the scaling coefficients and the offset coefficients.

14. The electronic device of claim 9, the at least one memory further storing instructions that, when executed by the at least one processor, cause the at least one processor to:
detect a saturation area of the non-reference image frame; and
blend the detected saturation area into the calibration-corrected non-reference image frame.

15. The electronic device of claim 14, the at least one memory further storing instructions that, when executed by the at least one processor, cause the at least one processor to:
remove lens-shading corrected (LSC) data from at least one of the reference image frame or the non-reference image frame, the mask based on the reference image frame and the non-reference image frame that do not contain the LSC data; and
re-apply the LSC data to the calibration-corrected non-reference image frame prior to blending the detected saturation area into the calibration-corrected non-reference image frame.

16. The electronic device of claim 14, wherein:
the instructions that when executed cause the at least one processor to detect the saturation area comprise:
instructions that when executed cause the at least one processor to suppress a highest value among the color channels at each pixel location in the non-reference image frame and generate a saturation map; and
the instructions that when executed cause the at least one processor to blend the detected saturation area into the calibration-corrected non-reference image frame comprise:
instructions that when executed cause the at least one processor to blend the non-reference image frame and the calibration-corrected non-reference image frame based on the saturation map.

17. A non-transitory machine readable medium containing instructions that when executed cause at least one processor to:
obtain a reference image frame and a non-reference image frame;
generate a mask based on the reference image frame and the non-reference image frame;
determine a scaling coefficient and an offset coefficient for each of multiple color channels of the non-reference image frame based on pixels in the reference image frame and pixels in the non-reference image frame that are identified by the mask; and
apply the scaling and offset coefficients to the non-reference image frame in order to generate a calibration-corrected non-reference image frame.

18. The non-transitory machine readable medium of claim 17, wherein the instructions that when executed cause the at least one processor to generate the mask comprise:
instructions that when executed cause the at least one processor to:
generate a reference mask based on the reference image frame and a reference luma threshold;
generate a non-reference mask based on the non-reference image frame and a non-reference luma threshold; and
determine an intersection of the reference mask and the non-reference mask.

19. The non-transitory machine readable medium of claim 17, wherein the instructions that when executed cause the at least one processor to determine the scaling coefficient and the offset coefficient for each of the color channels of the non-reference image frame comprise:

instructions that when executed cause the at least one processor to:
   identify pairs of pixels based on the mask, each pair of pixels including one of the pixels of the reference image frame and one of the pixels of the non-reference image frame;
   fit a noisy model to the pairs of pixels; and
   use an objective function that includes the model to determine the scaling coefficients and the offset coefficients.

20. The non-transitory machine readable medium of claim 17, further containing instructions that when executed cause the at least one processor to:
   detect a saturation area of the non-reference image frame; and
   blend the detected saturation area into the calibration-corrected non-reference image frame.

* * * * *